United States Patent
Gossett et al.

(10) Patent No.: US 6,259,460 B1
(45) Date of Patent: Jul. 10, 2001

(54) METHOD FOR EFFICIENT HANDLING OF TEXTURE CACHE MISSES BY RECIRCULATION

(75) Inventors: Carroll Philip Gossett, Mountain View; Mark Goudy, Berkeley; Ole Bentz, Mountain View, all of CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/048,099

(22) Filed: Mar. 26, 1998

(51) Int. Cl.[7] .................................. G06F 1/20; G09G 5/00
(52) U.S. Cl. ........................................... 345/552; 345/506
(58) Field of Search .................................. 345/501–506, 345/520, 521, 514; 711/118, 144, 145, 169

(56) References Cited

U.S. PATENT DOCUMENTS

| | | | |
|---|---|---|---|
| 5,831,640 | * 11/1998 | Wang et al. | 345/521 |
| 5,987,567 | * 11/1999 | Rivard et al. | 711/118 |
| 6,000,019 | * 12/1999 | Dykstal et al. | 711/157 |
| 6,011,565 | * 1/2000 | Kuo et al. | 345/513 |

OTHER PUBLICATIONS

Open GL Reference Manual, The Official Reference Document for Open GL, Release 1 by the Open GL Architecture Review Board, Addison–Wesley Publishing Company, 1992, Table of Contents (pp. vii–ix), pp. 1–26, and diagram entitled "The OpenGL Machine".

Open GL Programming Guide, Jackie Neider, Tom Davis and Mason Woo, Addison–Wesley Publishing Company, 1993, Table of Contents (pp. xv–xxiii), pp. 259–290, 412–415, and 491–504.

Principles of Interactive Computer Graphics, Second Edition, William M. Newman and Robert F. Sproull, McGraw–Hill Book Company, 1979, Table of Contents (pp. vii–xii), pp. 3–8, and 406–408.

U.S. application No. 08/956,537, Wingett et al., filed Oct. 23, 1997.

U.S. application No. 09/048,024, Gossett et al., filed Mar. 26, 1998.

U.S. application No. 09/048,098, Gossett et al., Mar. 26, 1998.

The OpenGL Graphics System: A Specification (Version 1.1), Mark Segal, Kurt Akeley; Editor: Chris Frazier, Table of Contents (pp. i–iv), pp. 9–11, 67,68, and 85–105; unpublished; dated Mar. 4, 1997; Silicon Graphics, Inc.

(List continued on next page.)

Primary Examiner—Ulka J. Chauhan
(74) Attorney, Agent, or Firm—Staas & Halsey LLp

(57) ABSTRACT

A method of a computer graphics system recirculates texture cache misses into a graphics pipeline without stalling the graphics pipeline, increasing the processing speed of the computer graphics system. The method reads data from a texture cache memory by a read request placed in the graphics pipeline sequence, then reads the data from the texture cache memory if the data is stored in the texture cache memory and places the data in the pipeline sequence. If the data is not stored in the texture cache memory, the method recirculates the read request in the pipeline sequence by indicating in the pipeline sequence that the data is not stored in the texture cache memory, placing the read request at a subsequent, determined place in the pipeline sequence, reading the data into the texture cache memory from a main memory, and executing the read request from the subsequent, determined place and after the data has been read into the texture cache memory.

25 Claims, 10 Drawing Sheets

OTHER PUBLICATIONS

Computer Graphics, Principles and Practice, Second Edition in C, James D. Foley, Andries van Dam, Steven K. Feiner, and John F. Hughes, Addison–Wesley Publishing Company, Jul. 1997, Table of Contents (pp. xvii–xxiii), pp. 38–40, 67–227 (including plates 1.1–1.34), 229–283, 471–531, 611, 614, 616–647 (including plates ll.1–ll.39), 741–745, 800, 805–853 (including plates lll.1–lll.28), 855–922, 923–1006, 1015–1018, and 1083–1112.

Open GL Programming Guide, Second Edition, The Official Guide to Learning Open GL, Version 1.1, Mason Woo, Jackie Neider, and Tom Davis, Addison–Wesley Developers Press, Jul. 1997, Table of Contents (pp. v–xv), pp. 1–14, 317–373, 529–553 and 609–627.

* cited by examiner

SYSTEM BLOCK DIAGRAM

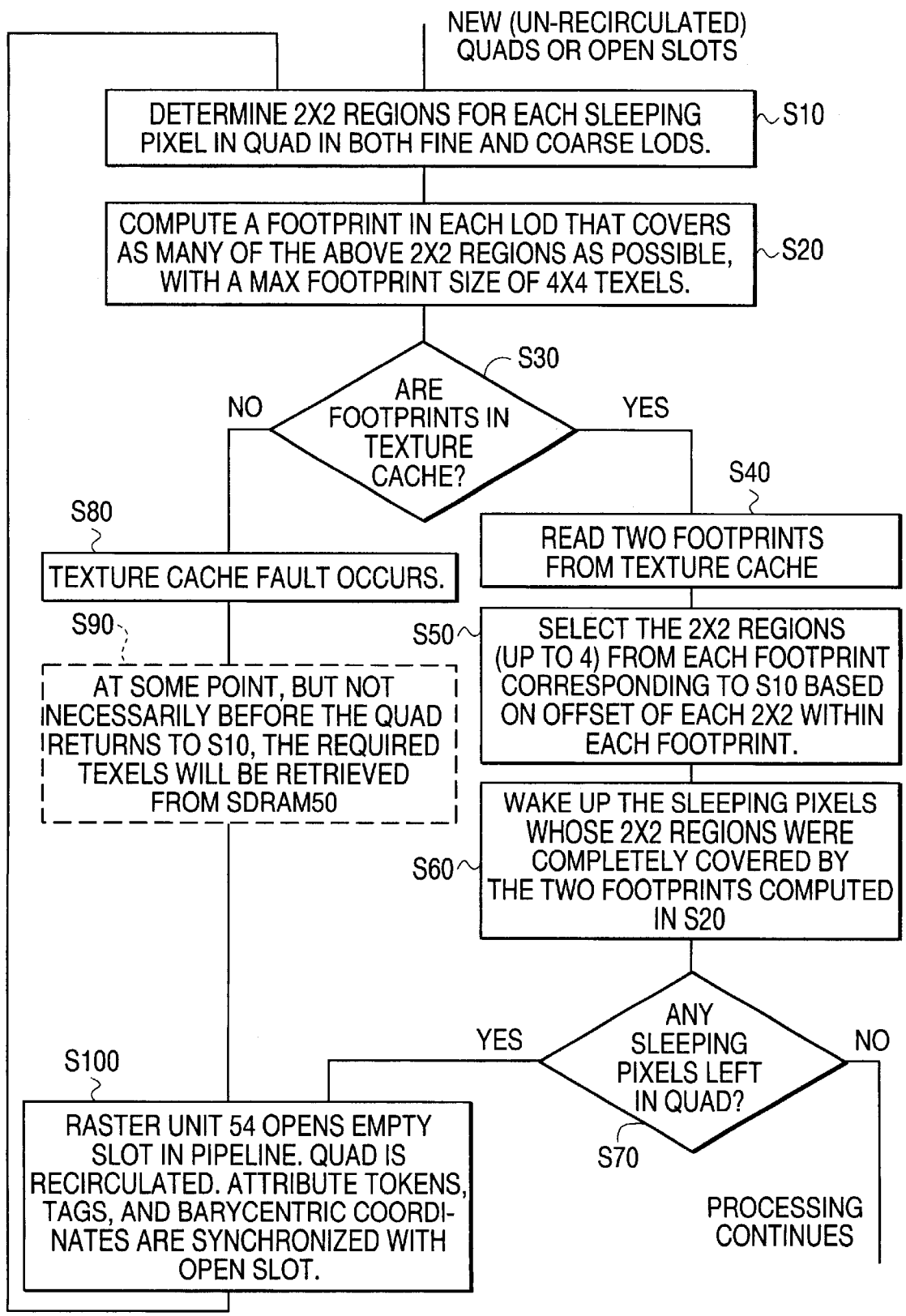

METHOD FOR EFFICIENT HANDLING OF TEXTURE CACHE MISSES BY RECIRCULATION

CROSS-REFERENCE TO RELATED APPLICATIONS

This application is related to U.S. patent application Ser. No. 09/048,098, entitled *A Method for Improving Texture Locality for Pixel Quads by Diagonal Level-of-Detail Calculation*, by Carroll Philip Gossett, filed concurrently herewith and which is incorporated herein by reference; U.S. patent application Ser. No. 09/048,024, entitled *A Method for Accelerating Minified Texture Cache Access*, by Carroll Philip Gossett now U.S. Pat. No. 6,104,415, filed concurrently herewith and which is incorporated herein by reference; and U.S. patent application Ser. No. 08/956,537, entitled *A Method and Appraratus for Providing Image and Graphics Processing Using A Graphics Rendering Engine*, filed Oct. 23, 1997 and which is incorporated herein by reference.

BACKGROUND OF THE INVENTION

1. Field of the Invention

The present invention is related to computer graphics hardware for which OPENGL (GRAPHICS LIBRARY) software is an interface thereto, and, in particular, to efficiently recirculating texture cache misses in the computer graphics hardware.

2. Description of the Related Art

Interactive graphics display, in general, is explained in *Computer Graphics: Principles and Practices*, Foley, vanDam, Feiner, and Hughes, Addison-Wesley, 1992, and in *Principles of Interactive Computer Graphics*, William M. Newman and Robert F. Sproull, Second Edition, McGraw-Hill Book Company, New York, 1979. Interactive graphics display generally includes a frame buffer storing pixels (or picture elements), a display, and a display controller that transmits the contents of the frame buffer to the display.

The OpenGL graphics system is a software interface to graphics hardware, and is explained in the *OpenGL Programming Guide, The Official Guide to Learning OpenGL, Second Edition, Release* 1.1, by the OpenGL Architecture Review Board, Jackie Neider, Tom Davis, Mason Woo, Addison-Wesley Developers Press, Reading, Mass., 1997, in the *OpenGL Programming Guide, The Official Guide to Learning OpenGL, Release* 1, by the OpenGL Architecture Review Board, Jackie Neider, Tom Davis, Mason Woo, Addison-Wesley Publishing Company, Reading, Mass., 1993, and in the *OpenGL Reference Manual, The Official Reference Document for OpenGL, Release* 1, the OpenGl Architecture Review Board, Addison-Wesley Publishing Company, Reading, Mass., 1993.

A computer model for interpretation of OpenGL commands is a client-server model. An application program being executed by one computer, typically the client computer, issues commands, which are interpreted and processed by another computer, typically the server computer, on which OpenGL is implemented. The client may or may not operate on the same computer as the server. A computer, then, can make calls through an OpenGL software interface to graphics hardware, and the graphics hardware can reside either on the same computer making the calls or on a remote computer.

A tool for describing how data is processed in OpenGL is a processing pipeline. The OpenGL processing pipeline 10 shown in FIG. 1 receives commands, and may store the commands for future processing in a display list 14 or execute the commands immediately. The OpenGL processing pipeline includes an evaluator 16, which approximates curve and surface geometry by evaluating polynomial commands of the input values; per-vertex operations and primitive assembly 18, in which geometric primitives such as points, line segments, and polygons, described by vertices, are processed, such as transforming and lighting the vertices, and clipping the primitives into a viewing volume; rasterization 20 produces a series of frame buffer addresses and associated values, and converts a projected point, line, or polygon, or the pixels of a bitmap or image, to fragments, each corresponding to a pixel in the framebuffer; per-fragment operations 22 performs operations such as conditional updates to the frame buffer 24 based on incoming and previously stored depth values (to effect depth buffering) and blending of incoming pixel colors with stored colors, masking, and other logical operations on pixel values. The final pixel values are then stored in the frame buffer 24.

Pixel operations 26 processes input data from the commands 12 which is in the form of pixels rather than vertices. The result of the pixel operations 26 is stored in texture memory 28, for use in rasterization 20. The resulting fragments are merged into the frame buffer 24 as if the fragments were generated from geometric data.

In addition, if texturing is enabled during rasterization 20, a texel is generated from texture memory 28 for each fragment and applied to the fragment. A texel is a texture element obtained from texture memory and represents the color of the texture to be applied to a corresponding fragment. Texturing maps a portion of a specified texture image onto each primitive.

Texture mapping is accomplished by using the color (Red (R), Green (G), Blue (B), or Alpha (A)) of the texture image at the location indicated by the fragment's (s, t, and r) coordinates. In the case of a 2-dimensional image (2-D image), s and t coordinates are applicable, and in the case of a 3-dimensional image (3-D image), then s, t, and r coordinates are applicable.

An example of a texture image 29 and the coordinates used to access it is shown in FIG. 2. FIG. 2 shows a two-dimensional texture image with n×m dimensions of n=3 and m=2. A one-dimensional texture would comprise a single strip. The values, $\alpha$ and $\beta$, used in blending adjacent texels to obtain a texture value are also shown. As shown in FIG. 2, values of s and t coordinates are each in the range of 0.0 to 1.0.

In implementing the OpenGL processing pipeline in the related art, a memory stores textures of images. Some of the textures are read into a texture cache during system initialization, while others are read into the texture cache upon a texture cache miss. Although there are many reasons that a system may experience a texture cache fault, such as during heavy minification of an image, most texture cache faults are data-dependent, and depend upon the s, t, and r coordinates which are calculated in the OpenGL processing pipeline.

If a texture cache fault occurs in the related art, then the OpenGL processing pipeline must be stalled to allow the system to retrieve the required data from the memory, and store it in the texture cache. However, the OpenGL processing pipeline is difficult to stall in that a performance penalty is assessed in completing the OpenGL processing pipeline and displaying an image. In addition, stalling the OpenGL processing pipeline would typically require a gated clock and/or a multiplexer to be placed at the input of every flipflop used in the OpenGL processing pipeline.

A problem in the related art is that texture cache faults occur in retrieving textures from the texture cache for pixels already launched in the OpenGL processing pipeline, requiring that the OpenGL processing pipeline be stalled.

Another problem in the related art is that performance of the OpenGL processing pipeline is reduced when texture cache faults occur.

A further problem in the related art is that the OpenGL processing pipeline must be stalled to allow data to be retrieved from the memory and read into the texture cache when texture cache faults occur.

SUMMARY OF THE INVENTION

The present invention solves the above-mentioned problems of the related art.

An object of the present invention is to recirculate texture cache misses into the OpenGL processing pipeline.

Another object of the present invention is to process texture cache misses without stalling the OpenGL processing pipeline.

A further object of the present invention is to maintain OpenGL processing pipeline performance if a texture cache fault occurs.

The present invention overcomes the problems in the related art and accomplishes the above-mentioned objects.

The present invention recirculates a texture cache request (i.e., a texture cache read request) resulting in a texture cache miss into a predetermined, earlier stage of the OpenGL processing pipeline, without stalling the OpenGL processing pipeline.

The present invention increases the performance of a graphics chip implementing the present invention by enabling the graphics chip to run at a relatively higher clock rate, increasing the performance of the graphics chip, but not stalling the graphics pipeline of approximately 150 stages being executed by the graphics chip. The present invention can be implemented at a low cost and with minimal design complexity.

If texture cache request resulting in a texture cache miss occurs, the present invention processes the next texture cache request without stalling the OpenGL processing pipeline while the data requested by the faulted texture cache request is read in from the texture memory. Instead of stalling the OpenGL processing pipeline as in the prior art, the present invention transmits a signal to circuitry corresponding to a prior step in the OpenGL processing pipeline, and reinserts the texture cache request that resulted in the texture cache miss into the prior step, while, concurrently, the requested data is read from the texture memory and stored in the texture cache. Consequently, when the previously-faulted texture cache request is again presented to the texture cache, the requested data is stored and available in the texture cache, for retrieval and use in response to the texture cache request. If the requested data remains unavailable when the texture cache request is again presented to the texture cache, then the texture cache request is recirculated subsequently, and repeatedly, until the requested data is available for retrieval from the texture cache when the texture cache request is presented to the texture cache.

By the method of the present invention, texture cache requests are processed without stalling the OpenGL processing pipeline.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 10 is a flowchart of the method of texture cache miss recirculation of the present invention.

DESCRIPTION OF THE PREFERRED EMBODIMENTS

The present invention resides in a single-chip implementation of OpenGL, in which matrices are composed on a host computer and evaluated on the single chip.

The present invention is directed to recirculating a texture cache request resulting in a texture cache miss into the OpenGL processing pipeline without stalling the OpenGL processing pipeline. The present invention is explained in detail herein below, after an explanation of the preferred embodiment of the graphics subsystem 42 of the graphics system 30 in which the present invention is implemented.

Figure 1:
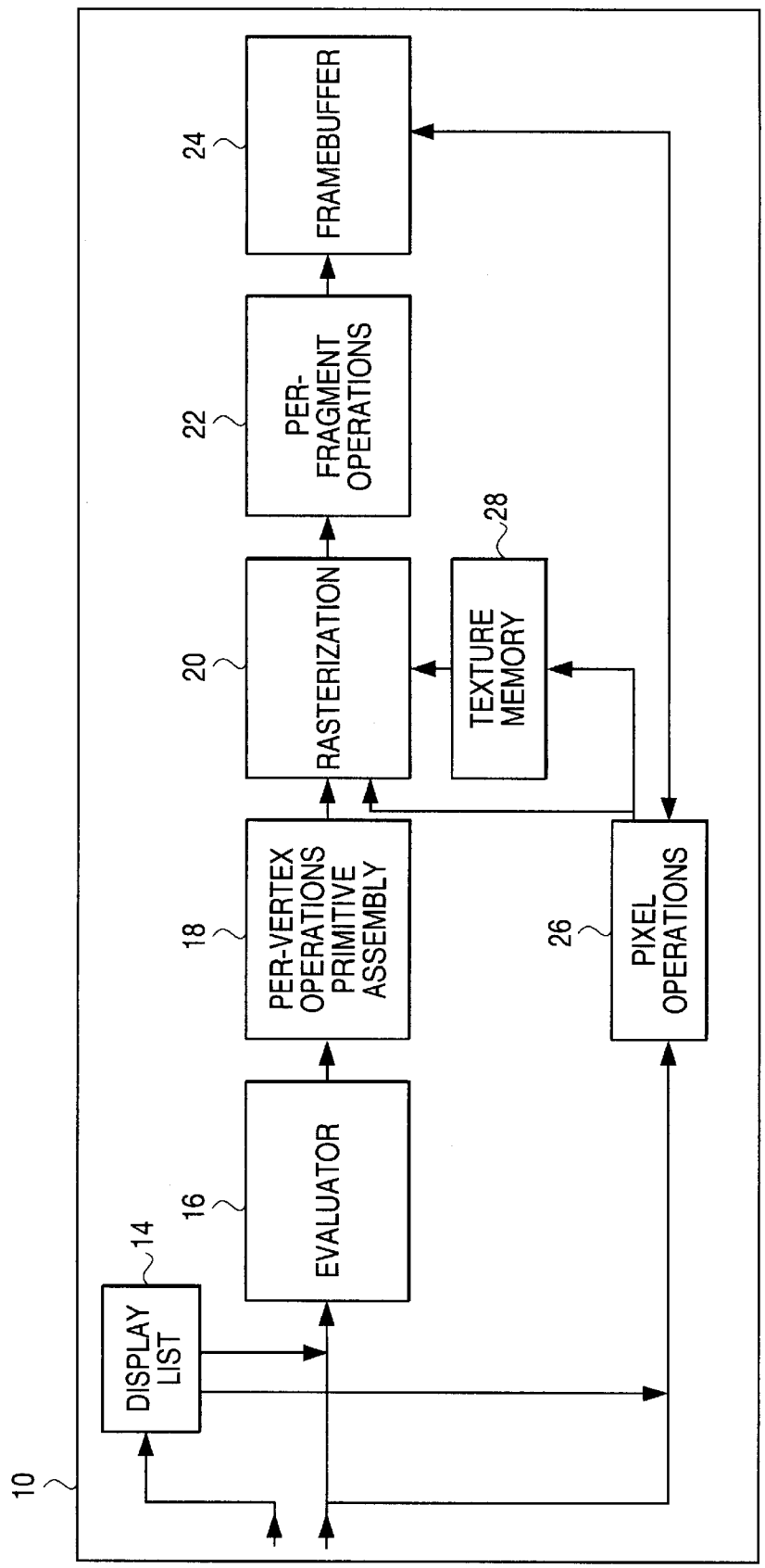
FIG. 1 is a diagram of an OpenGL processing pipeline of the related art.
Figure 2:
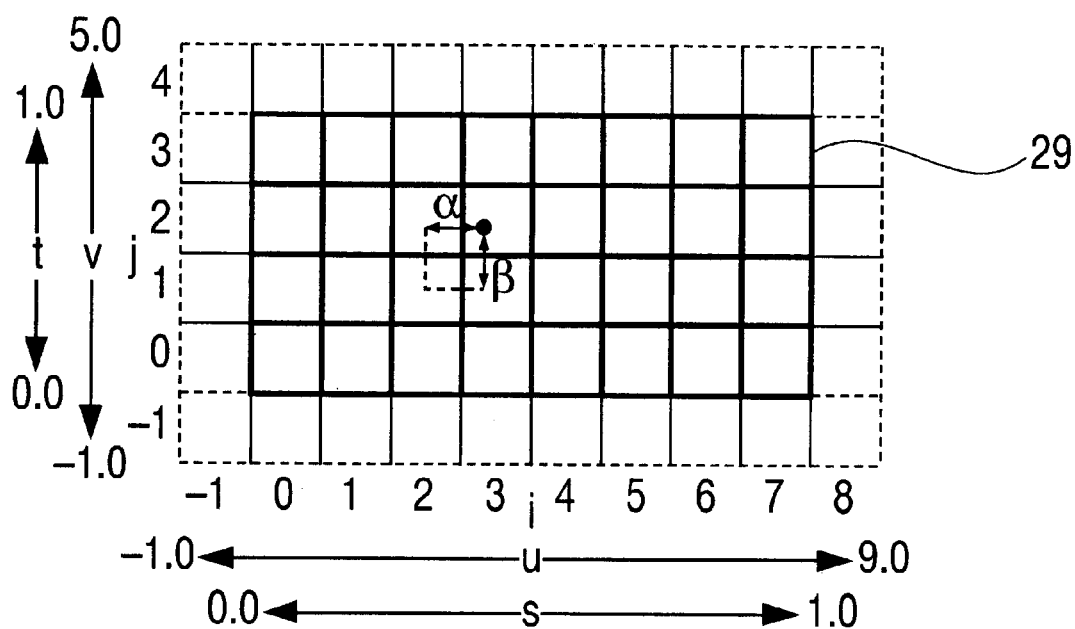
FIG. 2 is a diagram of a texture image and the coordinates used to access it.
Figure 3:
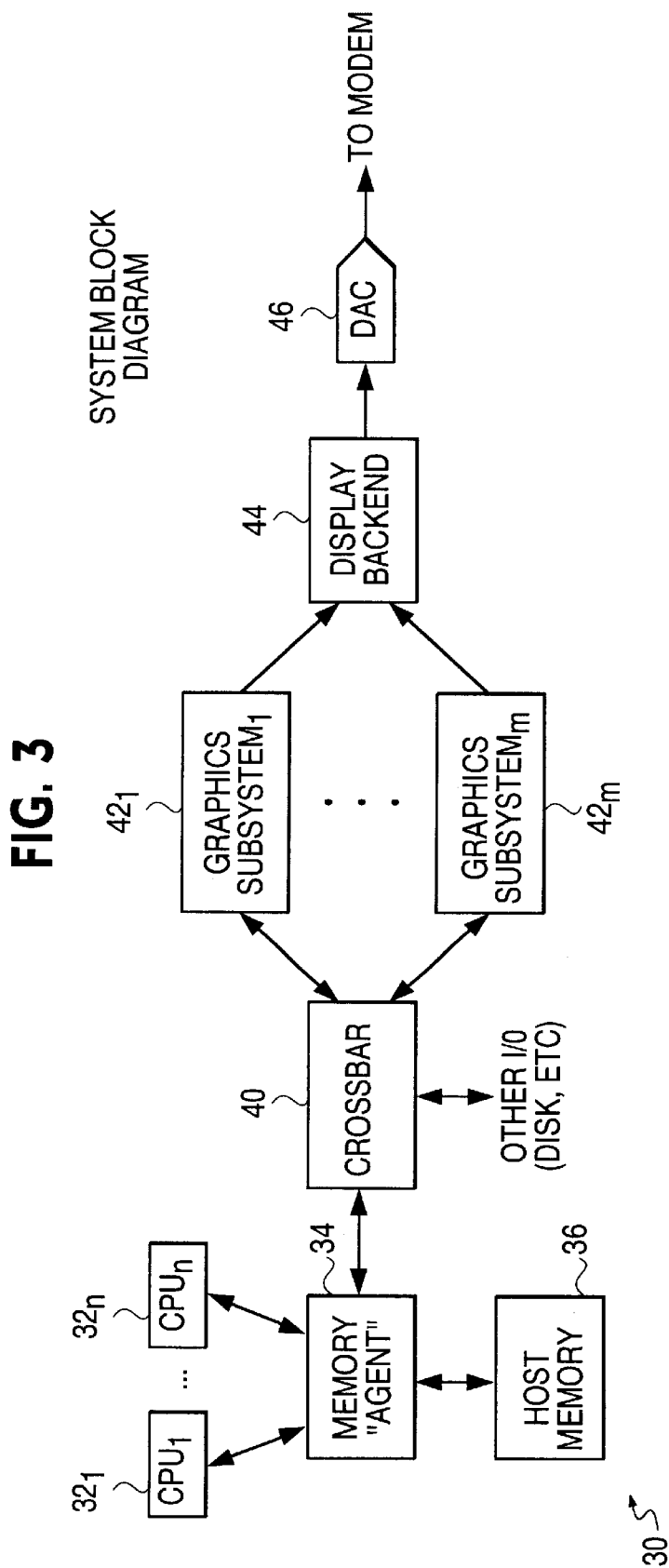
FIG. 3 is a block diagram of a graphics system according to the present invention.

As shown in FIG. 3, in the graphics system 30 according to the present invention, central processing units (CPUs) $32_1$ through $32_n$ execute OpenGL software commands 12 (not shown in FIG. 3), using memory agent 34 and host memory 36. A command stream, which is analogous to subroutine calls calling an OpenGL API library, is pushed immediately by the CPU to be executed by the hardware implementing the OpenGL system, and, accordingly, a push model is representative of the OpenGL system.

The memory agent 34 then transmits the commands 12 to crossbar switch 40. Then, commands 12 are transmitted to graphic subsystems $42_1$ through $42_m$, which process the commands 12 in a token stream (commands, including GL commands, are mapped to integer tokens), as described in further detail herein below. After graphic subsystems $42_1$ through $42_m$ process the commands 12, a display backend 44 transfers the processed data to digital-to-analog (DAC) converter 46, then to a monitor for display.

Figure 4:
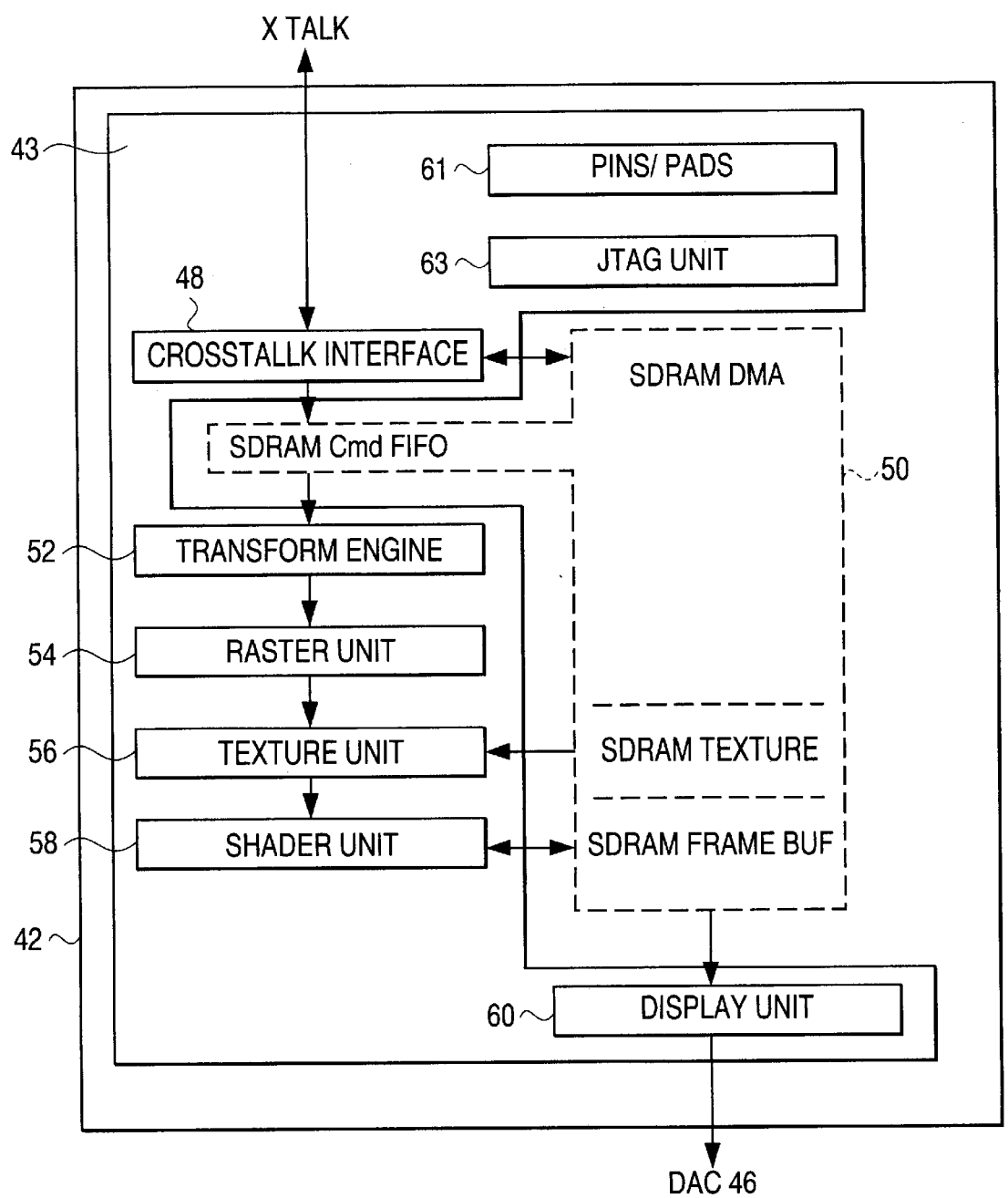
FIG. 4 is a block diagram of a hardware organization of a chip implementing the present invention.

FIG. 4 is a block diagram of a graphic subsystem 42 of the present invention. Graphics subsystem 42 comprises graphics chip 43 and SDRAM 50, coupled to graphics chip 43.

As shown in FIG. 4, CROSSTALK interface 48, which is also referred to as a graphics front end, interfaces to the rest of the graphic system 30 through XTALK (or CROSSTALK). CROSSTALK is a router/connection unit available from Silicon Graphics, Inc. Graphics front end 48 comprises a XTALK peer-to-peer interface, a DMA engine (including formatting), and a command first-in, first-out (fifo) buffer. The command fifo is maintained in SDRAM 50, as shown in FIG. 4. The command fifo is nominally 1 ms. worth of latency.

Graphics front end 48 also directs incoming streams to intended destinations, provides all support for chained graphics subsystems 42 in multi-subsystems 42 configurations, provides access in and out for the SDRAM 50, provides DMA channels for graphics and video, formats input and output streams, manages context switching and context states, provides a read path for graphics registers, and provides access to the display backend 44 through Display Unit 60.

Also as shown in FIG. 4, Transform Engine 52 interfaces to both the graphics front end 48 and the raster unit 54 on a first-in, first-out basis, receives commands and data from the graphics front end 48, and sends computed data to raster unit 54. The main computations performed in the transform engine 52 include geometry transforms of both vertices and normals (MVP and MV matrices). Transform Engine 52 is responsible for all geometry calculations in graphics subsystem 42, including performing vertex transforms and lighting computations for Phong Shading, and Gouraud Shading. In addition, Transform Engine 52 performs texture transform.

Raster unit 54 of FIG. 4 parses command tokens transmitted from the Transform Engine 52, schedules all SDRAM 50 memory transactions, rasterizes each primitive by recursive subdivision, and generates perspective-corrected barycentric parameters which are used to bi-lerp (bilinear interpolate) among the 3 vertices for each triangle. Raster unit 54 also includes the framebuffer cache.

In addition, raster unit 54 includes line and point antialiasing, and the control for a framebuffer cache. Frustum clipping is effectively performed by the recursive subdivision rasterization in raster unit 54, and user clipped planes are performed using the sign bit of the bi-lerps for the texture coordinates to invalidate user-clipped pixels.

Barycentric coordinates for a triangle are a set of three numbers a, b, and c, each in the range of (0,1), with a+b+c=1 and which uniquely specify any point within the triangle or on the triangle's boundary. For example, a point P in a triangle having vertices A, B, and C, and area a from the triangle having vertices P, B, and C (the edge within the triangle opposite from the vertex A), area b from the triangle having vertices P, C, and A (the edge within the triangle opposite from the vertex B), and area c from the triangle having vertices P, A, and B (the edge within the triangle opposite from the vertex C) is given by $$P=(Axa+Bxb+Cxc)/(a+b+c).$$

Raster unit 54 also generates an attribute tag pipeline 95 and a barycentric pipeline 93, which are discussed in further detail herein below, and which are generated after generation of the barycentric coordinates. Raster unit 54 performs Hilbert curve rasterization.

A graphics pipeline may include attributes, a coverage mask, and barycentric coordinates. In the present invention, the graphics pipeline would include the attribute token pipeline 92, the barycentric pipeline 93, the attribute tag pipeline 95, and hardware elements comprising the raster unit 54, the texture unit 56, and the shader unit 58, explained in detail herein below.

Raster unit 54 receives the attribute token pipeline 92 from software executed on a host computer. The attribute token pipeline 92 transmits data originating from OpenGL calls executed on the host computer. The attribute token pipeline 92 is formed when the above-mentioned OpenGL calls are translated into the data by a driver available from Silicon Graphics, Inc. running on the host computer and are transmitted to the graphics chip 43.

Also as shown in FIG. 4, texture unit 56 includes level of detail calculation, texture addressing, control for the texture cache, the texture tree filter for lerps (linearly interpolate) and the TLUT (texture color lookup table). Texture unit 56 also includes an SRAM for an on-chip texture cache, and the texture cache SRAM is organized as 16 banks×512 words× 48 bits. Texture unit 56 is explained in further detail herein below.

Shader unit 58 shown in FIG. 4 includes shading and depth bi-lerps, per-pixel lighting, pre-lighting texture environments and post-lighting texture environments, fog, multi-fragment polygon antialiasing, and per-fragment tests and operations.

A display unit 60 is provided in each graphics subsystem 42, as shown in FIG. 4. The display backend 44 shown in FIG. 3 includes the display units 60 of the graphics subsystems 42, and additional functions. The display unit 60 shown in FIG. 4 includes all of the pixel processing which occurs between the framebuffer and the output of the graphics subsystem 42 to the DAC or display backend 44. The display backend 44 combines the output from multiple graphic subsystems 42 for output by the DAC 46, or divides the output from the graphics system 30 to up to 4 DACs 46.

The display unit 60, transfers pixels and overlay/WID data from the framebuffer interface into first-in, first-out queues (FIFOs), changes pixels from the framebuffer format into a standard format RGB component format, maps color indexed into final RGB pixel values and applies gamma correction to all pixel data, generates all timing control signals for the various parts of the display unit 60, and provides read and write access to registers and memories in the display unit 60.

The graphics chip 43 of the present invention also includes pins/pads 61 for physical access to the graphics chip 43, and JTAG unit 63 for chip testing purposes.

Figure 5:
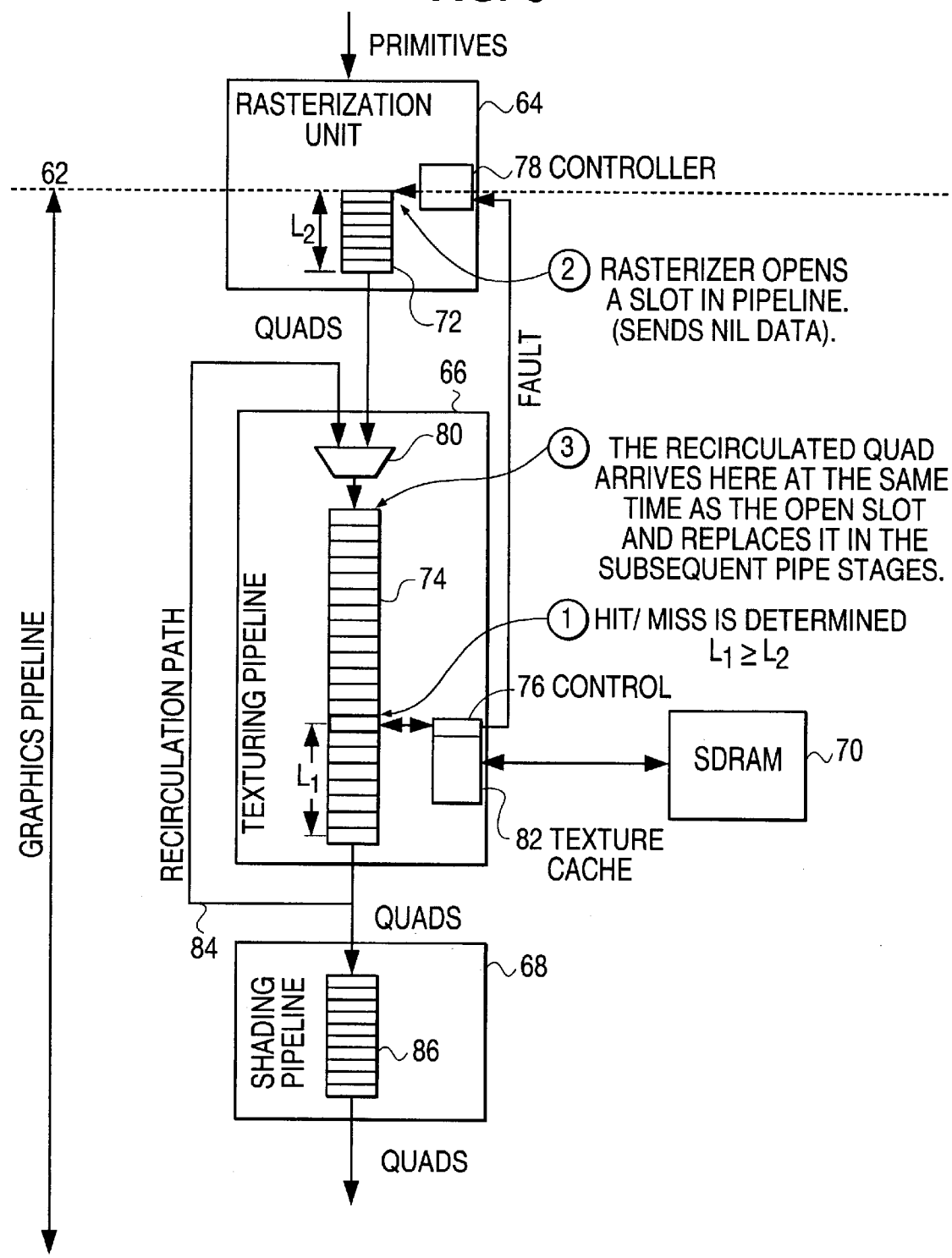
FIG. 5 is an overview of the present invention.

The focus of the present invention resides in Raster Unit 54 and Texture Unit 56, which are described in greater detail with reference to FIGS. 6–12, after an overview of texture cache miss recirculation in accordance with the present invention as shown in FIG. 5.

FIG. 5 is a diagram showing the general operation of the present invention in graphics pipelines, and is applicable to graphics pipelines including OpenGL, Microsoft DIRECT 3D, and other graphics pipelines. Texture cache recirculation in accordance with the present invention involves graphics pipeline 62, including a rasterization unit 64, a texture unit 66, a shading unit 68, and an SDRAM (synchronous dynamic random access memory) 70.

As shown in FIG. 5, primitives at the level of a triangle enter the rasterization unit 64 and are rasterized into pixels covering the area of a primitive. The pixels are grouped into sets of four referred to as pixel quads (or quads) and transmitted into the $L_2$ portion of the pipeline 74. In the texturing unit 66, the x, y, z address of the pixels and the corresponding texture address s, t, and r are examined. Each s, t, and r address corresponds to a given pixel, and the s, t, and r addresses flow through the texturing pipeline 74 after the gating unit 80. However, for the purposes of explanation, pixel quads are referred to in the remainder of FIG. 5. In addition, the present invention is applicable to both 2-dimensional images and 3-dimensional images.

The present invention recirculates a texture cache miss without stalling the graphics pipeline below controller 78, as shown in FIG. 5. Therefore, the constraint $L_1 \geq L_2$ (the delay of a pixel quad transmitted through the $L_1$ portion of the graphics pipeline must be greater than or equal to the delay through $L_2$) is imposed by the raster controller 78 so that the raster controller 78 has enough time to create an open (or empty) slot in the raster pipeline 72 to send nil data instead of transmitting another pixel quad. Accordingly, when a pixel quad is being recirculated back to the top of the texture unit 66, the constraint of $L_1 \geq L_2$ allows the recirculated pixel quad to arrive at the gating circuit 80 at the same time as the open slot created by the raster controller 78. The recirculated pixel quad replaces the open slot in the remaining stages of the graphics pipeline 62. $L_2$ and $L_1$ are predetermined numbers, dependent upon the physical design of a graphics chip implementing graphics pipeline 62.

As shown in FIG. 5, when a texture cache 82 miss occurs, the texture cache controller 76 sends a fault signal to the controller 78 to open an empty slot in the raster pipeline 72, concurrently with the texture cache 82 reading the requested data from the SDRAM 70. The texture cache controller 76 also marks as sleeping (if not so already marked) the pixel quad based upon which a texture cache 82 access was attempted, and the sleeping pixel quad continues through the $L_1$ section of the texturing pipeline 74, then through the recirculation path 84 to the gating unit 80, concurrently with the texture cache controller 76 sending the fault signal to the raster controller 78 and with the texture cache 82 accessing the requested data from the SDRAM 70.

When the raster controller 78 receives a fault signal from the texture cache controller 76, the raster controller 78 counts a predetermined number of cycles to wait based upon $L_1$ and $L_2$ before inserting an empty slot in the raster pipeline 72 of the graphics pipeline 62, ensuring that the empty slot will meet the recirculated pixel quad in the gating unit 80 of the texture unit 66. In a preferred embodiment of the present invention, the predetermined number of cycles counted by the raster controller 78 is around 30 cycles.

Because $L_1 \geq L_2$, then the sleeping pixel quad is placed into the empty slot opened in the raster pipeline 72 portion of the graphics pipeline 62 in the gating unit 80, without having to stall the graphics pipeline 62. When the recirculated pixel quad reaches the texture cache 82, then the requested data may be available in the texture cache 82, having been read from the SDRAM 70 and stored in the texture cache 82 during the recirculation of the pixel quad. If the requested data is not available in the texture cache 82 when the recirculated pixel quad reaches the texture cache 82, the recirculated pixel quad is again recirculated, and the pixel(s) therein for which a corresponding texel has not been retrieved remains designated as sleeping.

A pixel and its associated information thus recirculated is referred to as sleeping and is designated accordingly. Sleeping pixels are pixels which are being recirculated because a corresponding texel has not yet been retrieved for the sleeping pixel. A pixel is designated as sleeping upon origination by setting a bit corresponding to the pixel. Until a corresponding texel is retrieved from the texture cache upon recirculation of the sleeping pixel, pixels remain designated as sleeping. Thereafter, the sleeping pixels will eventually be displayed. Since the OpenGL processing pipeline is not stalled upon a texture cache miss, the sleeping pixel is both recirculated and continues in the OpenGL processing pipeline into the shading pipeline 86 in the shader unit 68, with the same calculations performed on the sleeping pixel as would be performed on a pixel not designated as sleeping. However, a sleeping pixel which continues in the OpenGL processing pipeline is not stored in the framebuffer for eventual display.

After the sleeping pixel has been recirculated and the corresponding texel has been retrieved from the texture cache 82, the mark of sleeping is removed from the pixel by the texture cache controller 76. The pixel then proceeds through the OpenGL processing pipeline as would any pixel experiencing a texture cache hit and is stored in the framebuffer for eventual display.

In the present invention, the sleeping pixel quad continues into the shader unit 68. In the shader unit 68, calculations are performed on the sleeping pixel quad and are then discarded because sleep bits associated with the sleeping pixel quad are set by the texture cache controller 76 and indicate that the sleeping pixel quad should not be acted upon by the shader unit 68. In an alternate embodiment of the present invention, the sleeping pixel quad could be routed to the shader unit 68 but would not be acted upon by the shader unit 68. In still another alternate embodiment of the present invention, the sleeping pixel quad would not be routed to the shader unit 68 at all.

In contrast to sleeping pixels, dead pixels are pixels which will not be written into the framebuffer due to clipping with the near, the far, or one or more of the user-clipped planes.

Figure 6:
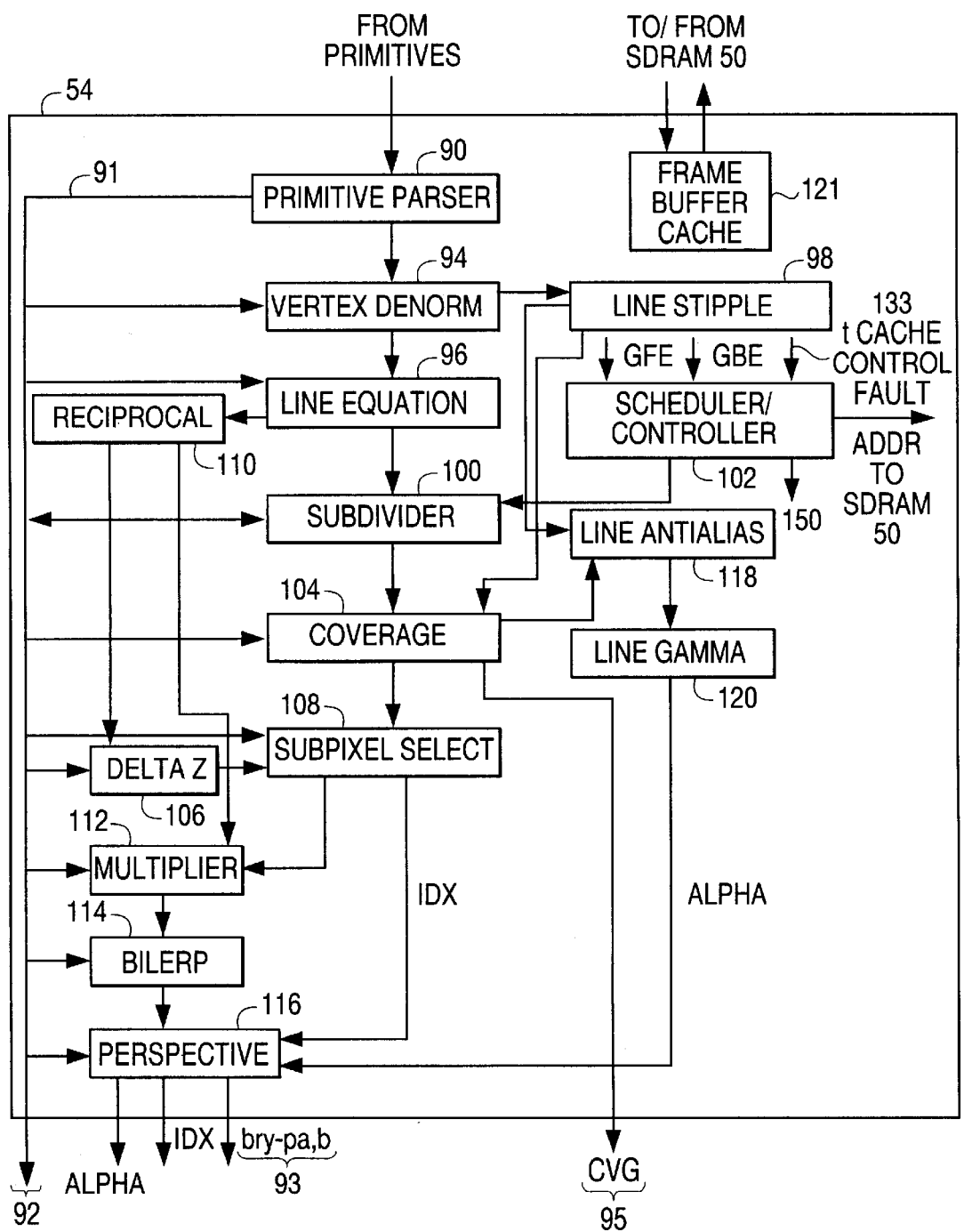
FIG. 6 is a detailed diagram of raster unit of a chip implementing the present invention.

FIG. 6 is a detailed diagram of the raster unit 54. As shown in FIG. 6, primitive parser 90 parses the command tokens coming from the transform engine 52. Its main function is to control the read pointer of the fifo between the CROSSTALK interface 48 and the raster unit 54 during multipass operations, so the correct attribute updates can be re-transmitted for each pass of a multipass operation. It also eliminates tokens not for the raster unit 54, texture unit 56, and shader unit 58, and snaps vertices to grid, and transmits token stream 91. Token stream 91 conveys modes, such as 1-D, 2-D, shading, etc., and includes vertex data, such as s and t coordinates, RGBA data, Z (or depth) data, per vertex data, and is coupled to the attribute token pipeline 92 (shown in FIG. 7).

Vertex denormalizer 94 receives incoming floating point vertices one primitive at a time, under control of the parser 90. Values are passed through a denormalizer 164 in preparation for the line equation 96 and the line stipple 98 blocks to which the results are sent.

Line Equation 96 calculates the edge equation signed floating point distances for each of 4 corners of the largest recursive subdivision region (4K by 4K) against each of the 3 edges of the triangle being rendered. The mantissas are denormalized and the exponents correspondingly adjusted such that the exponents for all 4 corner distances to each one of the edges are common for that edge. The exponents need not be the same between the triangle edges. This block produces 12 mantissas, but only 3 unique exponents, for distances. This block also computes a signed, floating point primitive area value and sends it to the reciprocal block. For point or line primitives, only the two major edges are passed thru; endcaps are processed by a bounding box computed in the subdivider 100.

Line Stipple 98 accepts denormalized vertex data from the vertex denormalizer 94 and generates per primitive values for line octant sent to coverage 104 and line antialiasing 188 blocks, and also calculates line stipple advance for connected lines. It later calculates a stipple distance per rasterized quad and determines the current line stipple pattern index, and extracts the pattern value and generates associated opaque/transparent per pixel control. It contains the line stipple state RAM for context save/restore.

Recursive Subdivider 100 recursively subdivides from the largest region (4K by 4K) down to a quad (2 by 2) pixels. It generates new edge equation signed distances at each subdivision level by averaging from the corners of the level above. At the tile level (16 by 16 pixels), all levels down to the quad are processed in parallel. The pattern of recursive subdivision implements a Hilbert curve. There is also a set of counters to rasterize a rectangular region in normal raster order for pixel operations. Back pressure is applied by the scheduler to delay rasterization when other requesters for the SDRAM 50 have won an arbitration for access to the SDRAM 50.

Scheduler 102 schedules the usage of the SDRAM 50 by arbitrating for the future time when the framebuffer cache 121 read-modify-write would be contending for the memory. This makes it possible to not have to stall the rest of the graphics pipeline. Other requesters for the SDRAM 50 are the command fifo in and out, texture loads, and the display. Scheduler 102 also receives graphics front end (GFE) and graphics backend (GBE) signals, as well as fault signal 133 and control signal 150 (signals 133 and 150 are explained herein below with reference to FIG. 7). Scheduler 102 also outputs addresses addr, including the correct access strobes, etc., directly to the SDRAM 50

Coverage unit 104 further recursively subdivides from the quad down to the subpixel level. The signs of the edge equation distances are then used to determine for each subpixel whether or not it is covered by the primitive being rendered. If the value of an edge is exactly zero, then the neighboring pixels in the quad are examined to guarantee only one primitive sharing an edge with another primitive will cover any particular subpixel. For multi-fragment antialiasing, there are 8 subpixels per pixel in a staggered pattern. For point-sampling, all 8 are at the same location at the center of the pixel. Due to the exactness of the calculation, there is no need for an epsilon offset to properly handle pinwheel vertex cases.

Delta Z 106 calculates dz/dx and dz/dy, for use by the subpixel select block 108, as well as the multi-fragment antialiasing block.

Subpixel Select 108 selects the nearest-in-depth covered subpixel, and outputs two of the edge equation signed distances for subpixel, which is later used to generate the barycentric coordinates.

Barycentric unit 110 calculates the reciprocal of the area of the triangle being rendered, which is later used to generate the barycentric coordinates.

Barycentric Multiplier 112 calculates the barycentric coordinates for the selected subpixel of each pixel to be rendered by multiplying each of 2 of the edge equation signed distances by the reciprocal of the area of the triangle.

Barycentric Bilerp unit 114 bilinearly interpolates 1/w using the barycentric coordinates, which is later used to perspective-correct the barycentric coordinates.

Perspective Correction unit 116 does the perspective correction of the barycentric coordinates, using the bilinearly interpolated 1/w.

In addition, and also as shown in FIG. 6, raster unit 54 comprises line antialias unit 118, line gamma unit 120, and frame buffer cache 121.

Line gamma unit 120 outputs alpha bits, and coverage unit 104 outputs a coverage mask into the token stream 91.

Both alpha and idx are routed to the shader unit 58 for use in antialiasing, and are recirculated upon a texture cache miss in the present invention.

After x and y coordinates are determined for a pixel, and coverage values are established by the coverage unit 104 of the raster unit 54, but before the barycentric coordinates bry-pa,b are established, a particular pixel has passed a point of no return and becomes committed to the OpenGL processing pipeline. If an attempt is made to retrieve a texel corresponding to the committed pixel from the texture cache 134, and the attempt fails to return a texel, a texture cache miss is experienced, and recirculation of the texture cache miss in accordance with the present invention then occurs, as explained herein below.

Figure 7:
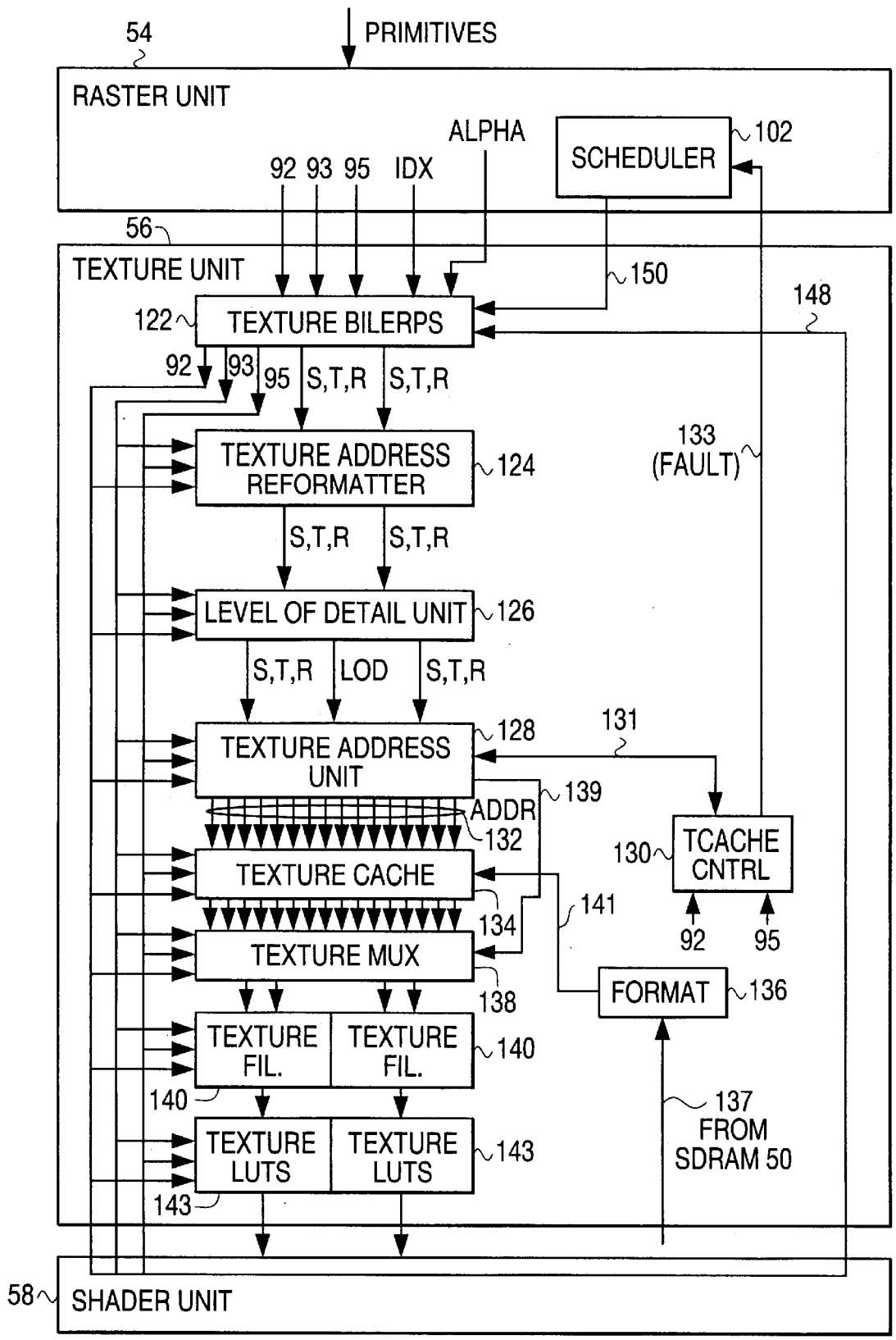
FIG. 7 is a detailed diagram of a texture unit of the present invention in relation to a raster unit and a shader unit of the graphics chip implementing the present invention.

FIG. 7 is a block diagram of texture unit 56, in relation to raster unit 54 and shader unit 58. As shown in FIG. 7, attribute token pipeline 92 includes the token stream 91 and transmits attribute information, including S, T, and R (also referred to as s, t, and r) coordinates, to the texture unit 56. Attribute token pipeline 92 is transmitted throughout graphic subsystem 42, and includes vertex data such as the s, t, and r coordinates, RGBA information, and per-vertex information, in the token stream 91, and may include the alpha output of the line gamma unit 120, and the idx (index) output of the subpixel select unit 108 generated in the raster unit 54. The output of the Perspective unit 116 (which is the barycentric coordinates) forms barycentric pipeline 93. The output of the coverage unit 104 forms attribute tag pipeline 95.

In the texture unit 56, both of the attribute token pipeline 92 and the attribute tag pipeline 95 interface to texture bilerps 122, texture address reformatter 124, level of detail unit 126, texture address unit 128, tcache control 130, format unit 136, texture mux 138, texture filters 140, and texture LUTs 143. The barycentric pipeline 93 interfaces only to the texture bilerps 122.

Texture unit 56 includes all of the logic required to create a texture fragment (or texel) for combination with a pixel fragment at the blend stage of the rendering pipeline implemented by the graphic subsystem 42. Textures are preloaded from DMA.

The texturing process implemented in the texture unit 56 begins with evaluation of texture coordinate quads (the S, T, and R, or s, t, and r, coordinates) corresponding to pixel coordinate quads (X, Y, and Z, also referred to as x, y, and z) in the texture bilerps 122. The pixel quads arrive as pixel pairs in time multiplexed fashion at the input to the texture address reformatter 124. The texture address reformatter performs a float to fixed conversion on the coordinates for basic 1-dimensional, 2-dimensional, and 3-dimensional texturing modes.

Next, and also as shown in FIG. 7, for most texturing modes, and, in particular, for 1-dimensional and 2-dimensional texturing, a level of detail calculation is performed in the level of detail unit 126 based upon the pixel quads presented to the level of detail unit 126 from the texture address reformatter 124.

The level of detail calculation derives the size of the texel in pixel space, and is a diagonal level of detail calculation. The diagonal level of detail calculation of the present invention is explained in *A Method for Improving Texture Locality for Pixel Quads by Diagonal Level-of-Detail Calculation*, id.

Once the level of detail is computed, the quad of pixels in pairs of S, T, and R coordinates that entered the level of detail unit 126, along with a level of detail (LOD) value, are output by the level of detail unit 126. Addressing calculations can then be made in the texture address unit 128 based on the glTexparameter settings associated with the current texture image. GlTexparameter settings are part of the OpenGL graphics system described in the *OpenGL Programming Guide, The Official Guide to Learning OpenGL, Release* 1.1, id.

The texture address unit 128 then outputs a set of quad texel addresses 132 which are applied to the texture cache 134 so that a corresponding and proper set of texel fragments are retrieved from the texture cache 134 for eventual filtering. In mipmapping operations, the set of addresses fetches a four texel neighborhood from each of the two maps that bound the calculated size of the bilerped (bilinearly interpolate) quad. For non-mipmapped operations, only one map is available and therefore only the quad texel's footprint in that map is used in the filtering process.

The texture cache 134 is organized into 16 banks of 512 words×48 bits of data. In the present invention, texture cache 134 is a direct mapped, hashed cache.

The operation of the texture address unit 128 and the texture cache 134 is explained in further detail in *A Method for Accelerating Minified Texture Cache Access*, id.

In addition, the texture address unit 128 interfaces to the texture cache control unit 130, which provides texture cache fault information 133 to a scheduler 102 in the raster unit 54. Further, the format unit 136 receives a 256-bit bus 137 from SDRAM 50, and provides input 141 to the texture cache 134.

The textures originate from the SDRAM 50, and are loaded along the 256-bit bus 137 into the format unit 136, which expands or compresses the formats depending upon in what format the texture was stored. Then, a portion of that texture image is loaded into the texture cache 134. From the texture cache 134, the texels are loaded through the texture mux 138. Therefore, the texture mux 138 does not interface directly to the SDRAM 50 because data is first loaded into the texture cache 134 before being used elsewhere in the graphics pipeline of the present invention.

The texture mux 138 receives the output of the texture cache 134 and selects subregions of the texels read out of the texture cache 134. The output of the texture cache 134 is a 4×4 texels footprint, so 16 texels are output from the texture cache 134 at a time. The 16 texels are always adjacent (for example, 4 adjacent by 4 adjacent) to each other. The texture mux 138 selects 4 2×2 subregions of the 4×4 region. There are many different combinations of 2×2 subregions of texels within the 4×4 region of texels of the image; for example, the lower left corner 2×2 subregion, the lower right corner 2×2 subregion, etc. The texture mux 138 selects any 4 of those combinations depending upon where the 2×2 subregions are situated relative to the 4×4 footprint. The texture mux 138 outputs 16 RGBA values, 4 for each 2×2 subregion. Accordingly, there are 4 subregions, each containing 4 texels, and each texel having an RGBA value. The texture multiplexer 138 outputs texture fragments RGBA, which is the color (RGB) of the texel and the alpha of the texel.

The texture address unit 128 determines which 2×2 subregion that the texture mux 138 should select, based upon the tmux control signal 139 output by the texture address unit 128 to the texture mux 138. To determine which 2×2 subregion to select, the texture address unit 128 examines a quad of pixels flowing through the texture unit 56 through attribute token pipeline 92, and determines which 2×2 regions of the overall texture image must be pulled out to provide the required texels for each of the pixels. There is one 2×2 subregion required for each pixel in the quad of pixels, so 4 of the 2×2 subregions are selected by the texture address unit 128. Once the texture address unit 128 determines where the 4 of the 2×2 regions selected reside in the overall picture image, the texture address unit 128 determines how many of the 2×2 subregions fit into one of the types of footprints that can be read from the texture cache 134, such as the 4×4 footprint.

In many cases, all 4 of the 2×2 subregions fit within the 4×4 footprint. For the pixels having corresponding texels within the 4×4 footprint, the corresponding texels are read from the texture cache 134. However, if all 4 of the 2×2 subregions do not fit within the 4×4 footprint, then additional texels not within the 4×4 footprint must be retrieved from the texture cache during a subsequent recirculation.

If texels are not within the texture cache, they must be retrieved from the SDRAM 50, and the texture address unit 128/texture cache 134 indicates the texture cache fault to the tcache control unit 130 through bus 131, and a texture cache fault 131 is generated. The texture cache fault 131 is transmitted to scheduler 102, as shown in FIG. 7. Scheduler 102 then opens a slot (which is an empty space) in the graphics pipeline (including the attribute token pipeline 92, the barycentric pipeline 93, and the attribute tag pipeline 95), and notifies subdivider 100 in the raster unit 54 of the request for an open slot. The subdivider 100 carries the request forth through the rest of the raster unit 54, including the coverage unit 104, subpixel select unit 108, multiplier 112, bilerp 114, and perspective unit 116 of raster unit 54. Concurrently therewith, the requested texels are read from the texture memory in the SDRAM 50 into the texture cache 134.

For the texels for which a texture cache fault has been submitted, the texels are read from SDRAM 50 along bus 137 through format unit 136 and along bus 141 into the texture cache 134 during the same time period in which recirculation of the quad of pixels occurs, thus preventing a stall in the graphics pipeline. Accordingly, in parallel with the recirculation of the above-mentioned data during a texture cache miss in the present invention, the texture cache 134 retrieves from the texture memory the requested data, and stores the requested texel in the texture cache 134. When that same texel is subsequently requested for retrieval from the texture cache 134, the requested texel is present in the texture cache 134, and the texture cache 134 does not then experience a miss.

Data being transmitted in parallel in the attribute tag pipeline 95 with the pixel quads includes a sleep bit corresponding to each pixel within the quad. The sleep bits indicate which, if any or all, of the four pixels within the quad of pixels is sleeping. A pixel is considered sleeping when the pixel is being recirculated based upon a texture cache fault. The sleep bits, when generated, indicate that a corresponding pixel is sleeping, and are turned off if a texture cache 134 hit occurs corresponding to that pixel. If the sleep bits corresponding to a pixel remain turned on after a texture cache 134 access is attempted, then subsequent processing of the corresponding pixels occurs in the graphics pipeline, but the results of same are discarded. At a tap point, which is the point at which recirculation occurs, and, in a preferred embodiment of the present invention is placed after the per-pixel lighting in the shader unit 58, the data corresponding to the pixel, including the data transmitted along the attribute token pipeline 92, the barycentric pipeline 93, and the attribute tag pipeline 95, is recirculated along recirculation bus 148 to the texture bilerps 122. The tap point is selected such that the condition of $L_1 \geq L_2$ of FIG. 5 is satisfied.

The recirculated quad of pixels is integrated back into the attribute token pipeline 92, the barycentric pipeline 93, and the attribute tag pipeline 95 by respective controllers 154 based upon control signal 150 transmitted from scheduler 102 to each of the respective controllers 154 (shown in FIG. 8), as explained in further detail herein below. At the tap point, a copy of each pixel is recirculated to the controllers 154, and the synchronization controller 152 (explained herein below) in the scheduler 102 determines, based upon the state of the sleep bits in the pixel, whether the pixel is being recirculated to reenter the graphics pipeline or whether the pixel is merely a copy of a pixel which does not require recirculation through the texture unit 56. If the pixel is a copy of a pixel which does not require recirculation through the texture unit 56, then that pixel is discarded. However, if the pixel is being recirculated through texture unit 56, as explained below, the pixel is integrated into the graphics pipeline by controllers 154.

The attribute tag pipeline 95 also includes, corresponding to each pixel, a coverage mask indicating the percentage of the pixel that falls within a primitive, a phase bit indicating whether the corresponding pixel is included in the first or second cycle of the 2 cycles of 2 pixels of the quad, and other data.

In the final stages of the texturing process, various filtering functions are performed on the texels to calculate the ultimate contribution the texels make to the fragment color. The first filter operation is the actual weighted averaging of the mipmap neighborhoods to produce the interpolated texel fragment, in texture filters 140 and texture LUTs (Texture Look-up Tables) 143. Additional recirculation of data within the texture filters 140 occurs.

The output of the texture LUTs 143 is presented to shader unit 58. In addition, attribute token pipeline 92, barycentric coordinate pipeline 93, and attribute tag pipeline 95 feed into shader unit 58, and recirculation bus 148, which recirculates texture addresses for a texture cache miss and which is explained in detail herein below, is received from shader unit 58 into the texture bilerps 122. The recirculated data transmitted on the attribute token pipeline 92, the barycentric coordinate pipeline 93, and the attribute tag pipeline 95 are recirculated on the recirculation bus 148 generated at the tap point (the point at which the foregoing data is recirculated). In a preferred embodiment of the present invention, the tap point is located in the shader unit 56, after per-pixel lighting occurs.

The texture unit 56 provides 1-dimensional, 2-dimensional, and 3-dimensional (orthographic) texture mapping with high performance.

Also included in the texture mapping process, but accomplished in the shader unit 58, is advanced pixel shading techniques applied in the next two stages (per pixel lighting and lighting environment), and, as a final operation optionally performed on the texel fragments, the application of fog.

The texture unit 56 has additional data paths and configurations not shown in FIG. 7 that allow the texture unit 56 to implement other advanced imaging operations such as convolutions and fast fourier transforms (FFTs). Additional explanation is provided in *A Method and Apparatus for Providing Image and Graphics Processing Using A Graphics Rendering Engine.*

Shader unit 58 includes the shading and depth bilerps, the per-pixel lighting, the two texture environments (pre- and post-lighting), fog, multi-fragment polygon antialiasing, and the per-fragment tests and operations. The shading Bilerp is responsible for generating the current color for each fragment in all OpenGL lighting modes. Eight identical 12-bit Bilerp Modules can be configured to generate four 12-bit color components or a single 24-bit monochrome component for two fragments each cycle. The bilerps for both pixels being rendered in the current clock cycle get the same attributes, but different barycentric coordinates. The Depth Bilerp consists of 2 sub-blocks for the 2 pixels per clock, identical in that they have 3 floating point inputs, 2 32-bit floating point perspective-corrected barycentric coordinates, and a single floating point output.

Figure 8:
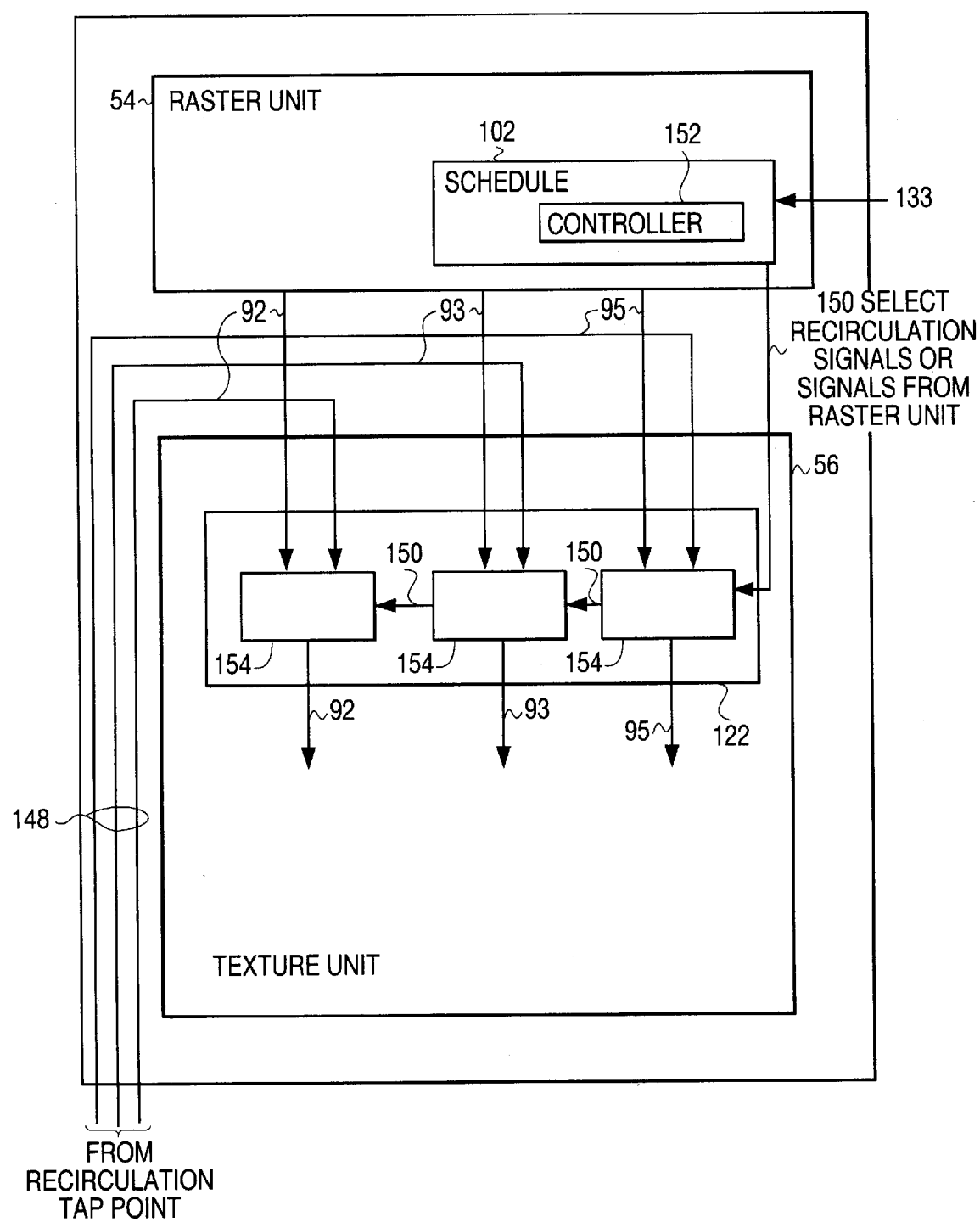
FIG. 8 is a detailed diagram of recirculation control in the present invention.

FIG. 8 is a detailed diagram of recirculation control in the present invention.

As shown in FIG. 8, scheduler 102 comprises synchronization controller 152. Synchronization controller 152 determines which of new data and recirculated data will be transmitted through texture unit 56 and shader unit 58, based upon whether fault signal 133 is asserted by tcache control unit 130. If fault signal 133 is asserted by tcache control unit 130, indicating that a texture cache fault has occurred, synchronization controller 152 opens a slot in the attribute token pipeline 92, the barycentric pipeline 93, and the attribute tag pipeline 95 to allow the data recirculated from the tap point along recirculation bus 148 to be placed in the open slot by the controllers 154 in the texture bilerps 122.

Synchronization controller 152 is a delay adjustment controller synchronizing the timing between the open slot and the recirculated attributes. In the present invention, there is typically a delay between the recirculation of the sleeping pixel and the creation by the raster unit 54 of the open slot in which the attributes of the sleeping pixel will be inserted. Therefore, synchronization controller 152 accounts for the above-mentioned delay. In a preferred embodiment of the present invention, a predetermined number of steps of approximately 30 steps are executed after a texture cache 134 access is attempted and a pixel remains designated as sleeping and accordingly recirculated, and the open slot is available for insertion of the recirculated attributes.

Primitives must be processed in order, but pixels which are in each primitive may be processed out of order. It is acceptable for one quad of pixels to be processed before another quad of pixels in a given primitive, but all pixels within the given primitive must be processed before any pixels within the next primitive. The synchronization controller 152 must ensure that the open slot corresponding to recirculated pixels is at least within the same primitive as prior to being recirculated.

In the OpenGL processing pipeline, attributes transmitted on the attribute token pipeline 92, the barycentric pipeline 93, and the attribute tag pipeline 95 are partitioned by triangle and include barycentric coordinates, screen coordinates (x and y coordinates), coverage mask, alpha values for aliased lines.

Triangles must be processed in order. Therefore, synchronization controller 152 tracks whether there is an open slot available in the texturing pipeline or all slots are filled. If there is an open slot, then the synchronization controller 152 can insert new valid data into the open slot. If the open slot moves to the bottom of the texturing pipeline, then there is space available in the recirculation pipeline for the synchronization controller 152 to insert a new, valid quad of pixels. Accordingly, the synchronization controller 152 tracks both where there are open slots in the texturing pipeline and where there are filled slots in the texturing pipeline. Based upon the fault signal 131 received from the texture cache controller 130, the synchronization controller 152 determines whether to insert new quads of pixels or whether to delay inserting new quads of pixels and allow an open slot to occur at a given slot. Controllers 154 are each logical circuitry which inserts either data newly-generated by the raster unit 54 or recirculated data 148 into the pipelines 92, 93, and 95 based upon control signal 150 generated by scheduler 102 in response to fault signal 133.

The fault control signal 131 output by the texture cache controller 130 is a status signal indicating that the quad of pixels which the texture cache controller 130 just serviced did not get all of its sleep bits turned off, which means that the current quad is still sleeping. Based upon the fault signal 131, the synchronization controller 152 inserts an open slot so that the sleeping quad can recirculate.

If every single quad recirculates, the synchronization controller 152 receives a fault signal 131 from the texture cache control 130 for each quad faulted. Then the synchronization controller 152 inserts open slots in each cycle until a fault status signal 131 indicates that a current quad of pixels had received all of the data the quad requested, and, accordingly, will not be recirculated. In that case, the synchronization controller 152 places more quads into the graphics pipeline.

In the present invention, each primitive is assigned a 4-bit ID, and each quad belonging to that primitive receives the same 4-bit ID. The 4-bit ID follows the quad throughout the different slots that the quad may occupy. Each 4-bit ID corresponds to a pair of pipeline stages (representing one quad of pixels) and is stored locally in the synchronization controller 152. The 4-bit ID (which is referred to as the primitive ID) indicates to which sequential primitive a quad contained in the graphics pipeline belongs.

The primitives are processed sequentially. Based upon the primitive ID of a quad in a given pipeline stage, the synchronization controller 152 determines whether that quad belongs to the oldest primitive being recirculated. The synchronization controller 152 allows only the quads belonging to the oldest primitive being recirculated to be promoted out of the synchronization controller 152 and back into the OpenGL processing pipeline. Accordingly, the synchronization controller 152 includes logical bins for tracking, in order, the data corresponding to the pixels being recirculated. In a preferred embodiment, there are approximately 30 logical bins included in the synchronization controller 152.

All information associated with a pixel is recirculated upon a texture cache miss, including the above-mentioned barycentric coordinates bry-pa,b. Associated information not recirculated is recalculated based upon the recirculated information. Examples of information recalculated includes the s, t, and r coordinates, and the level of detail.

Figure 9:
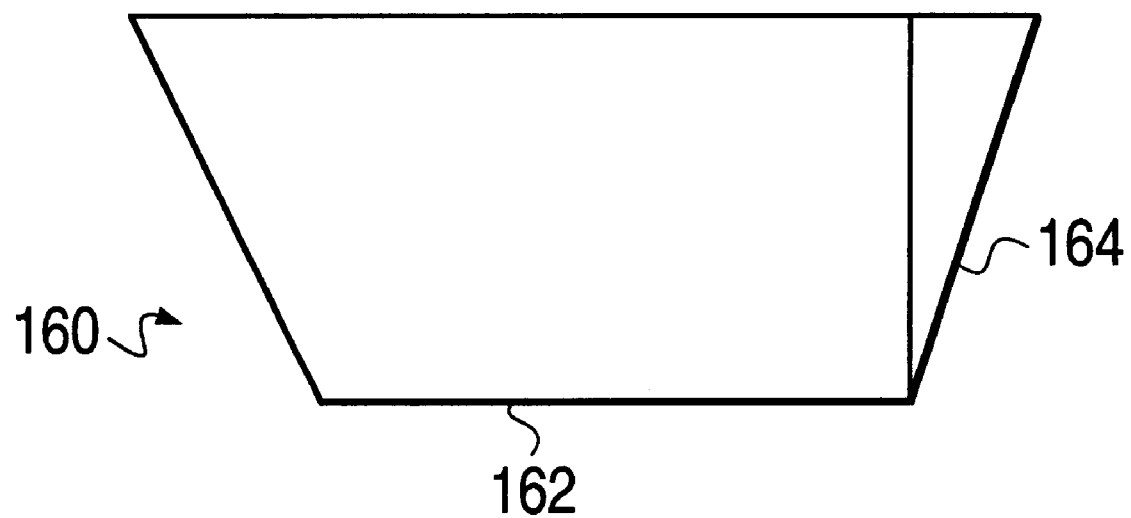
FIG. 9 is a diagram showing an example of a graphic footprint likely to produce a texture cache miss.

FIG. 9 is a diagram showing an example of a graphic footprint likely to produce a texture cache miss in accordance with the present invention. A texture cache miss may occur for a variety of reasons, such as a user stepping through a texture and a tile including the requested texel had not yet been read into the texture cache 134 from the texture memory, or a texel which is part of a trapezoid 160 having only two parallel sides as shown in FIG. 9. Attempted retrieval of a texel from section 162 of trapezoid 160 would likely produce a texture cache hit, whereas attempted retrieval of a texel from section 164 would likely produce a texture cache miss, and, thus, recirculation of the corresponding request for retrieval of a texel from section 164 only.

In a preferred embodiment of the present invention, texture cache misses would be bundled so that groups of texels which produced corresponding texture cache faults could be read into the texture cache 134 from the texture memory.

FIG. 10 is a flowchart of the method of determining whether to recirculate texture cache reads of the present invention, using the 2-dimensional mipmapped case as an example. In step S10, new (un-recirculated) pixel quads or pixel quads which were recirculated into open slots are received, and a 2×2 subregion is determined for each sleeping pixel in the quad in both the fine and the coarse levels of detail (LODs). The LODs are determined for the same texture in mipmapping. The fine LOD corresponds to a larger picture, and a coarse LOD corresponds to a smaller picture and includes more granularity than does the fine LOD. The 2×2 subregion for each pixel in the coarse LOD is trilinearly interpolated to the 2×2 subregion for each pixel in the fine LOD. Sleeping pixels from the current pixel quad are examined by the texture address unit 128 of the texture unit 56 to determine where are 2×2 subregions needed from texture image.

In step S20, a footprint is computed in each of the LODs that covers as many of the above-mentioned 2×2 subregions as possible, with a maximum footprint size of 4×4 texels. In step S30, the texture address unit 128 determines whether the above-mentioned footprints are in the texture cache 134.

If, in step S30, both of the footprints are in the texture cache 134, the two footprints are then read from the texture cache in step S40. In step S50, up to 4 2×2 subregions from each footprint are selected corresponding to step S10 based on an offset of each 2×2 subregion within each footprint.

Then, the sleeping pixels whose 2×2 subregions were completely covered by the two footprints computed in step S20 (i.e., for which corresponding texels were read from the texture cache 134) are awakened in step S60. The sleeping pixels are awakened by turning off the sleep bit corresponding to the sleeping pixel. If no sleeping pixels remain in the quad, then processing continues in step S70. However, if any sleeping pixels remain in the quad, processing proceeds to step S100, which is explained in detail below.

Referring again to step S30, if both of the footprints computed in step S20 are not in the texture cache 134, then a texture cache fault occurs in step S80. As shown in step S90, concurrently with recirculation of the pixel quad, but not necessarily before the quad returns to step S10, the required texels are retrieved from SDRAM 50 and written into the texture cache 134.

Then, in step S100, raster unit 54 opens an empty slot in the graphics pipeline, and the pixel quad is recirculated. Attribute tokens, tags, and barycentric coordinates are synchronized with the open slot, and processing returns to step S10.

If the required texels are not available from the texture cache 134 when step S30 is executed for the recirculated pixel quad, the pixel quad is again recirculated.

The above-mentioned example shown in FIG. 10 corresponds to the 2-dimensional mipmapped cased, and the 1-dimensional mipmapped and/or non-mipmapped cases are degenerate cases of the example shown in FIG. 10. The 3-dimensional mipmapped case also corresponds to the example shown in FIG. 10, but in the 3-dimensional mipmapped case, the R coordinate is substituted for the LOD.

The present invention of recirculating texture cache misses as explained herein above allows the graphics chip implementing the present invention to run at a high clock speed, and, further, allows the graphics pipeline described herein above to run at full speed without stalling.

In addition, recirculation of cache misses in accordance with the present invention is applicable to general purpose central processing units accessing cache memory, other types of ASICs, and processors performing cache memory access.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method for continuous operation of a graphics pipeline, comprising:
   continuing partially-formed pixels in the graphics pipeline upon a texture cache fault; and
   recirculating in the graphics pipeline the partially-formed pixels to be again serviced by the texture cache.

2. The method according to claim 1, wherein the recirculating is repeated until the texture cache service results in a texture cache hit.

3. The method according to claim 1, wherein the partially-formed pixels are designated initially as sleeping and remain designated as sleeping upon the texture cache fault.

4. The method according to claim 3, wherein the recirculating is executed based upon whether the partially-formed pixels are designated as sleeping.

5. The method according to claim 3, wherein the partially-formed pixels are designated as sleeping by setting sleep bits, and the sleep bits are reset upon a texture cache hit corresponding to the partially-formed pixels.

6. The method according to claim 1, wherein the recirculating places the partially-formed pixels into the graphics pipeline at an earlier, predetermined slot.

7. The method according to claim 1, wherein the partially-formed pixels are grouped according to primitives, and the partially-formed pixels are recirculated in order based upon the primitives.

8. The method according to claim 1, wherein the partially-formed pixels are both recirculated in and continue along the graphics pipeline.

9. The method according to claim 1, wherein while the partially-formed pixels are being recirculated, other pixels are serviced by the texture cache and data corresponding to the partially-formed pixels is read from a memory to the texture cache.

10. The method according to claim 1, wherein the graphics pipeline is not stalled upon recirculation of the partially-formed pixels.

11. An apparatus including a texture cache and for continuous operation of a graphics pipeline, said apparatus comprising:
   a scheduler determining whether to place one of a quad of pixels and an open slot into the graphics pipeline based upon whether pixels are recirculated in the graphics pipeline; and
   a controller, coupled to the scheduler through the graphics pipeline, passing one of the quad of pixels and recirculated pixels into the graphics pipeline.

12. The apparatus according to claim 11, further comprising a recirculation bus coupled to the controller through the graphics pipeline and transmitting the recirculated pixels to the controller based upon a texture cache miss.

13. The apparatus according to claim 11, wherein the controller places the recirculated pixels into the open slot.

14. The apparatus according to claim 11, further comprising a recirculation point at which the quad of pixels are recirculated to the controller upon a texture cache miss.

15. The apparatus according to claim 11, further comprising a recirculation point at which the quad of pixels are recirculated to the controller if at least one sleep bit in the quad of pixels is set.

16. The apparatus according to claim 15, wherein sleep bits corresponding to the pixels are reset upon a texture cache hit.

17. A method of a graphics pipeline, comprising:
   determining 2×2 regions for each sleeping pixel in a quad of pixels in the graphics pipeline in both fine and coarse levels of detail;
   computing a footprint in each level of detail that covers as many of the 2×2 regions as possible, with a maximum footprint size of 4×4 texels;
   if texels corresponding to each of the footprints do not reside in a texture cache, issuing a texture cache fault to retrieve required texels from a memory, opening by a raster unit an empty slot in the graphics pipeline, and recirculating the quad of pixels in the graphics pipeline;
   if texels corresponding to each of the footprints reside in the texture cache, reading the texels from the texture cache, selecting up to 4 2×2 regions from each of the footprints based on an offset of each of the 2×2 regions within each of the footprints, and waking up the sleeping pixels whose 2×2 regions were covered by the footprints.

18. The method according to claim 17, wherein the quad of pixels continuously recirculates until texels corresponding to the footprints are read from the texture cache.

19. The method according to claim 18, wherein attribute tokens, tags, and barycentric coordinates are synchronized with the empty slot.

20. An apparatus including a continuously-operating graphics pipeline, said apparatus comprising:
   a raster unit comprising a scheduler determining whether to place one of a quad of pixels and an open slot into the graphics pipeline based upon whether pixels are recirculated in the graphics pipeline; and
   a texture unit comprising a controller, coupled to the scheduler through the graphics pipeline, passing one of the quad of pixels and recirculated pixels into the graphics pipeline.

21. The apparatus according to claim 20, further comprising a shader unit coupled to the texture unit and receiving one of the quad of pixels and the open slot.

22. The apparatus according to claim 20, wherein the texture unit further comprises a texture cache and wherein the scheduler determines whether to place the one of the quad of pixels and the open slot into the graphics pipeline based upon whether a texture cache miss has occurred corresponding to a sleeping quad of pixels.

23. The apparatus according to claim 22, further comprising a memory coupled to the texture cache and from which texels corresponding to the sleeping quad of pixels are read if the texture cache miss has occurred.

24. The apparatus according to claim 23, wherein the sleeping quad of pixels is passed into the empty slot by the controller and the graphics pipeline is configured such that the texels corresponding to the sleeping quad of pixels are available in the texture cache during recirculation of the sleeping quad of pixels in the graphics pipeline.

25. A method of a computer graphics system that recirculates texture cache misses into a graphics pipeline sequence without stalling the graphics pipeline sequence, said method comprising:

reading data from a texture cache memory by a read request placed in the graphics pipeline sequence;

if the data is stored in the texture cache memory, reading the data from the texture cache memory and placing the data in the graphics pipeline sequence; and if the data is not stored in the texture cache memory, recirculating the read request in the graphics pipeline sequence by indicating in the graphics pipeline sequence that the data is not stored in the texture cache memory, placing the read request at a subsequent, determined place in the graphics pipeline sequence, reading the data into the texture cache memory from a main memory, and executing the read request from the subsequent, determined place and after the data has been read into the texture cache memory.

* * * * *

UNITED STATES PATENT AND TRADEMARK OFFICE
CERTIFICATE OF CORRECTION

PATENT NO.    : 6,259,460 B1
DATED         : July 10, 2001
INVENTOR(S)   : Carroll Philip Gossett et al.

It is certified that error appears in the above-identified patent and that said Letters Patent is hereby corrected as shown below:

Column 2,
Line 34-35, delete paragraph break.

Signed and Sealed this

Fourteenth Day of May, 2002

*Attest:*

JAMES E. ROGAN
*Attesting Officer*   *Director of the United States Patent and Trademark Office*